United States Patent Office 2,895,335
Patented July 21, 1959

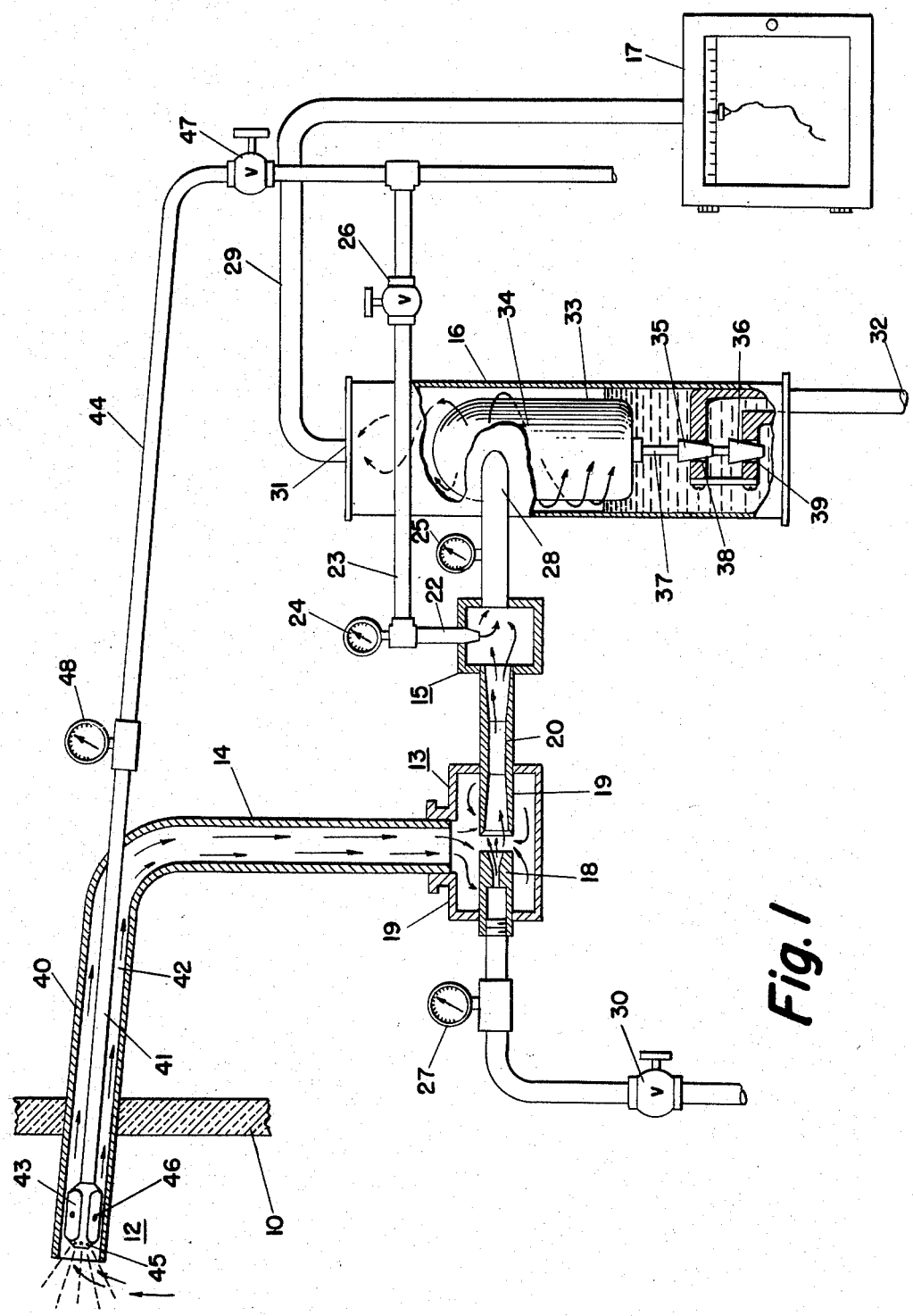

2,895,335

SYSTEMS FOR OBTAINING GAS SAMPLES
FOR ANALYSIS

Harry A. Kraftson, Bala-Cynwyd, Pa., and Edward M. Yard, Trenton, N.J., assignors to Leeds and Northrup Company, Philadelphia, Pa., a corporation of Pennsylvania Application January 12, 1956, Serial No. 558,731

6 Claims. (Cl. 73—421.5)

This invention relates to gas analysis and more particularly to systems for cleaning gas samples obtained from dust-ladened, contaminant and/or corrosive material containing atmospheres and has for an object the removal from a gas sample, prior to analysis, of solid and liquid particles, corrosive and contaminating matter while minimizing the addition to or removal from the gas sample of gaseous components affecting the accuracy of the analysis.

In the operation of processes, such as furnaces employed at power plants, it is desirable to analyze the combustion or flue gases to determine the composition of the gases, particularly the oxygen or the carbon dioxide content thereof, in order that adjustments, either manual or automatic, may be made to operate the furnaces or processes more efficiently. In carrying out the analysis, samples of the combustion gases are aspirated from an atmosphere, usually the atmosphere within a flue, by way of lines connected to a suitable gas analyzer. The gas samples obtained from the flue usually contain foreign matter such as, for example, fly ash and other solid particles, liquid particles, contaminating gases and the like which subject the sampling system to clogging by accumulation of the solid particles and to corrosion by liquids formed by the combination of the contaminating gases or water-soluble liquids or solids with vapor condensed from the gas sample. Such clogging and/or corrosion necessitates the frequent shut-down of the analyzing system in order that the sampling system be cleaned and corroded elements replaced. Frequent shut-down for maintenance purposes effectively prevents the use of gas-analyzing systems for automatic control purposes.

Hence it is another object of the present invention to provide a gas cleaning and sampling system which will make possible the use of gas analysis as a basis for continuous automatic control of a process.

While other systems and methods have been evolved for the purpose of obtaining clean gas samples, the present invention constitutes an improvement thereover by a new arrangement of elements which affords efficient cleaning of the gas samples over extended periods of time while minimizing maintenance costs.

In accordance with the present invention, there is provided for a gas-analyzing system a gas-cleaning arrangement including a gas sampling line having a steam ejector therein for aspirating from a dirty atmosphere a sample of the gas to be cleaned and analyzed. The sample of gas is combined with the steam to form an intimate mixture and the mixture is driven through the gas line by pressures produced at the ejector. A means is provided for adding water to the mixture to condense the steam about the foreign matter contained within the gas sample, thus to increase the effective mass of each particle of foreign matter. Adequate amounts of water are added to dilute any corrosive liquids formed by combination of the steam condensate with corrosive materials to prevent corrosion of elements of the sampling system. The temperature of the mixture of the condensate and the water is controlled to minimize the addition or removal of the components of the gas to be analyzed. The gas to be analyzed is then separated from the rest of the mixture and the clean, solid-free gas sample is conducted to a suitable analyzer.

In the course of obtaining gas samples, it has been found that where the ejector or aspirator is located at a point in the sampling line remote from the inlet of the sampling line clogging will take place by accumulation of solid particles usually at the aspirator or between the aspirator and the inlet and usually at a point where the temperature of the gaseous sample falls to its dew point. Therefore, in order to prevent clogging of the lines, there is provided in combination with the sampling and gas-cleaning arrangement of the present invention and particularly for use where gas samples are to be obtained from a dust-ladened atmosphere a water-washed sampling probe for preventing the accumulation of solid matter within the sampling lines. Many types of water-washed probes are available and suitable for use in conjunction with the present invention, including the improved water-washed probe described in copending application Serial No. 558,714, filed by H. A. Kraftson on January 12, 1956.

In the use of a gas analyzer for automatic control of a process, it is essential that the time lag of the sampling and analyzing system be reduced to a minimum. In a preferred form of the present invention there is provided a gas-cleaning arrangement whose time lag is of a relatively low order making suitable the use of an analyzer for automatic control purposes. More particularly, such a system comprises a gas sampling line having an inlet disposed within a dust-ladened atmosphere. A steam ejector is included in the line for developing at the inlet of the line a low pressure for flow into the line of a gaseous stream from the atmosprere. The gaseous stream is intimately mixed with the steam to surround particles within the stream with the steam and the mixture caused to flow at high velocity through the system. A stream of water is directed into the mixture of steam and the dust-ladened sample in amount adequate for condensation of the steam. The particles in the mixture form nuclei for condensation of the steam to form water droplets, thus increasing the apparent mass of the particles. A centrifugal separator is provided for development therein of a vortical flow of the mixture of condensed steam, water and gas sample at a speed developing centrifugal force for the movement of the water particles, condensed steam and entrained solid particles outwardly toward a wall of the separator with concurrent movement of the gas sample inwardly. A solid-free gas sample is withdrawn from the separator and conducted to an analyzer.

In another aspect of the present invention the ratio of the gas sample rate and feed rate of the condensing water is varied to minimize the percent by volume of oxygen released by the condensing water to the gas sample and to minimize the absorption by the water of carbon dioxide.

For other objects and advantages of the present invention, reference may be had to the following detailed description taken in conjunction with the accompanying drawing, in which:

Fig. 1 schematically illustrates in partial cross-section a gas-analyzing system including the improved gas-cleaning arrangement of the present invention.

Referring now to Fig. 1, there is illustrated one wall of a flue duct 10 of a furnace, the gases of which are to be continuously sampled, cleaned and analyzed in order to determine the concentration of one or more components such as, for example, oxygen or carbon dioxide. Samples of the flue gas are continuously drawn into the inlet opening of a sampling probe 12, which may be a simple tube, by creation of a low pressure at the inlet through the operation of an aspirator or ejector 13 connected in the sampling line 14. In accordance with the present invention, the gas sample is cleaned by the operation of the aspirator 13, which is of the steam type, a water condenser 15, and a separator 16 and analyzed by an analyzer 17. This sampling and cleaning arrangement is effective for removing solid particles ranging in size from less than one micron and larger and is capable of continuous operation for extended periods of time without the necessity of major maintenance requiring the shut-down of the system.

In the preferred arrangement, the aspirator 13 is comprised of a steam nozzle 18 which passes a high velocity jet of steam past the exhaust connection of the sampling probe 12 to produce at the inlet of the sampling probe a low pressure for aspiration of sample gases through the probe and into the steam jet. From the steam nozzle 18 to the analyzer 17, the system is under positive pressure due to the steam flow from the nozzle 18 and thus there is avoided the introduction into the system of contaminating atmospheric gases.

The steam aspirator 13 performs a first step in the conditioning of the gas sample for separation of solid particles and corrosive gases therefrom. The sample gases entering the aspirator 13 are intimately mixed with the steam from the nozzle 18. During the course of mixing, the steam surrounds the individual solid and liquid particles contained in the gas sample. The mixture of steam, gas and solid or liquid particles passes out of the chamber 19 by way of a diffuser 20 including a venturi section into the condenser 15 where the mixture is reduced in temperature and the steam condensed. The steam condenses about the solid or liquid particles, the particles serving as nuclei about which the condensed steam forms in droplets. The apparent weight of the dust particles is increased and thus the dust particles are conditioned for separation from the gas within the separator 16.

The condenser 15 is of the type in which water is fed into the condenser chamber from a nozzle 22 connected as by way of pipe 23 to a suitable source of water. While the water may be sprayed into the condenser, in the illustrated embodiment it is fed into the condenser in a solid stream. The stream of water from the nozzle 22 is fed into the condenser at sufficiently high pressure, for example 15 pounds per square inch, which may be indicated by gage 24, so that upon striking an oppositely disposed wall of the condenser the stream of water breaks up into droplets thoroughly intermixing with and rapidly cooling the gaseous mixture. Condensation of the steam is essentially complete by the time the mixture enters the separator 16.

Contrary to expectation, we have found that water may be introduced into the condenser 15 even though the water be of the type referred to as normal, that is, water which has not been deaerated, without materially affecting the accuracy of the oxygen measurement made of the gas sample. While the accuracy of the oxygen measurement is affected by the introduction of the air from the condenser water and while the amount of air released from the condenser water will increase with increase of water temperature, the error introduced in the actual measurement of oxygen content may be kept at a low value by making small the ratio of condenser water flow to sample gas flow. In this manner the amount of air released forms a very small percentage of the total volume of gas to be analyzed. For example, in one system now in use 30 cubic feet per hour of sample gas was drawn through the sampling system while condenser water was fed into the system at the rate of 60 gallons per hour. In this system the error introduced amounted to less than one-tenth of a percent of oxygen by volume. Thus, with the percentage of error known, the analyzer 17 may be preset to take into account this error and may be adjusted to render a continuous accurate reading of oxygen concentration. Because the error introduced by the illustrated system is of such a low order of magnitude, it has been found that overall variations in error over long periods of operation are also of a low order and for this reason the analyzer, once calibrated, need not again be adjusted unless the above ratio be altered.

The accuracy of the measurement of oxygen concentration is also affected by the degree of absorption of carbon dioxide in the condenser water. Inasmuch as gas analyzers measure concentration by volume, a change in the volume as by absorption of carbon dioxide will materially affect the percentage concentration of the other components. Accordingly, it is desirable to minimize absorption of carbon dioxide by the condenser water. Absorption of carbon dioxide will decrease with increase of water temperature. For example, at 20° C., 0.17 gram of carbon dioxide can be dissolved in 100 cubic centimeters of water. As the temperature of the water approaches its boiling point, the carbon dioxide absorption becomes essentially zero. Therefore, the amount of water introduced into the condenser 15 may be adjusted, as by a flow-controller shown as value 26, so that the water issuing from the condenser will be at a temperature sufficiently high, as indicated by temperature-responsive device 25, to minimize carbon dioxide absorption. For example, in one system the temperature of the water issuing from the condenser 15 was maintained at 140° F. In that system, the error in the oxygen measurement amounted to less than one-tenth of one percent.

Where the gas component to be analyzed is carbon dioxide, it may be desirable to maintain the water issuing from the condenser at a high temperature, for example, 140° F. and even higher. Although oxygen released from the condenser water increases with water temperature, the percentage change of oxygen content does not materially affect the accuracy of the carbon dioxide measurement. This is so when the quantity of oxygen in a gas sample is low, of the order of 5 parts per 100 of sample. Thus, a change in oxygen concentration of as must as 2% will only cause a change of 0.2 parts of carbon dioxide per 100.

The amount of water introduced into the condenser 15 will also be determined by the corrosive material concentration of the mixture fed to the condenser. Moisture may be present within the diffuser 19 particularly where the probe, as hereinafter described, may be of the water-washed type. Moisture may also be present because of partial condensation of the steam. In either event corrosive material present in the gas sample will go into solution with the moisture to form corrosive liquids. Under certain circumstances the concentration of acids or corrosive liquids thus formed may be increased to a value high enough to cause corrosion within the gas-cleaning equipment. Since the concentration of corrosive liquids increases with time of contact between gases and water, the concentration may be maintained at an effectively non-corrosive level by arranging the condenser physically as close as possible to the steam aspirator. The remainder of the corrosive gases is absorbed within the condenser 15 upon complete condensation of the steam. The additional corrosive liquids thus formed are diluted by the condenser water. Under most conditions the water required for condensation purposes will be adequate to provide the needed dilution of the corrosive liquids. The ratio of rate of gas sample flow and rate of condenser water flow may be controlled in several ways. The ratio may be varied by adjustment of condenser water-control valve 26. On the other hand, since the rate of gas sample is dependent upon the rate of steam flow, the gas sample rate may be varied by adjustment of steam-flow control valve 30. The rates of water and steam flow may be indicated by suitable flow meters (not shown). The relative rates of flow of the wash water in line 14, of the condenser water under control of valve 26, and of the gas sample and steam under control of valve 30 will determine the temperature of the mixture to which the device 25 responds. Changing the setting or opening of any one of valves 26, 30 or 47 will change the temperature of the mixture in line 28, the valves 26 and 30 having the greater temperature-controlling effects.

The mixture from the condenser 15 comprised of the condensed steam, conditioned solid or liquid particles, diluted acids and gases is then separated by causing the mixture to flow rapidly in a vortical path. The separation is here shown carried out within the centrifugal separator 16 having a tangential inlet 28 connected to the condenser 15. The mixture is introduced into the centrifugal separator at a high velocity imparted to the mixture by the flow of steam out of the steam nozzle 18. The mixture is rotated due to its own velocity at a high speed which develops centrifugal force for movement of the water particles and entrained dust particles outwardly and downwardly along the walls of the separator with coincident movement of the now clean gas sample inwardly and upwardly. The clean, solid-free gas sample taken or withdrawn from the upper portion of the separating zone within the separator 15 is conducted at high velocity to the analyzer 17 as by way of pipe or conduit 29. The velocity and pressure of gas introduced to the analyzer by way of line 29 may be varied by adjusting valve 30 controlling the flow of steam from the nozzle 18. The pressure of the steam is indicated by gage 27. Gas sample velocities of 50 feet per second or higher are easily attainable.

The volume of the separating portion of the centrifugal separator 16 is preferably made small, while still retaining efficient gas-cleaning characteristics, in order to reduce the time for a specific sample of gas to be moved from the inlet of the separator to the gas outlet thereof. This factor is of particular importance where the analyzer 17 is to be part of a control apparatus governing the operation of the furnace. In such instances the time lag, that is, the time it takes for gas sample to be drawn into the probe and finally introduced to the analyzer, should be as small as possible.

The centrifugal separator 16 is provided with a pair of outlets, one of which, the clean-gas outlet 31, is at all times open to the analyzer, the other one of which, the waste outlet 32, is operated by a float-controlled valve 33 to assure a predetermined separating space for the mixture and to provide a liquid seal, thus preventing loss of sample gases to the atmosphere. It will be understood that a liquid seal for the separator may be provided by other suitable means, for example, the well-known liquid trap.

The float-control valve 33 within the centrifugal separator 16 is of the balanced type and accordingly is moved to an open or closed position independently of the static pressures within the separator. The valve 33 includes a float member 34 which is responsive to the height of the water and waste mixture within the separator to open or close valves 35 and 36 mounted to a stem 37 attached to the underside of the float member 34. The float-control valve 33 maintains the height of the water and waste mixture at a substantially constant level. For example, when the volume of the water and waste mixture rises above a predetermined point, the float member 34 rises to lift the valve members 35 and 36 from their respective seats 38 and 39, thus permitting a quantity of the condensate to be exhausted by way of outlet 32. In the operation of the system, the valve 33 has proportional action, that is, the extent of opening of the valve will be proportional to the rate at which liquid is introduced into the condenser 15 and separator 16.

As aforesaid, the operation of the float-control valve 33 is independent of the static pressures within the separator by reason of the pressures acting upon valve member 35 in a downward direction being counteracted by the pressures being brought upon the valve member 36 in an upward direction. While the illustrated float-control valve 33 is of a preferred construction, it will be understood that other float-control valves may be substituted therefor and that other constructions of centrifugal separators and other forms of separators may also be employed for the separation of the sample gases from the water particles and solid matter. It is desirable, however, that the separator be of the centrifugal type in order that the time lag of the system be reduced to a value making practical the application of the gas-analyzing system to automatic control of a furnace or process.

While the gas sample and steam mixture have been described as treated in a water condenser 15 prior to introduction to the separator 16, it will be understood that the water may be introduced within the separator 16 for conditioning of the mixture and that such alternative arrangement is satisfactory.

In one installation of the present invention the analyzer 17 was located 180 feet from the probe 12. The time interval for a gas sample to reach the analyzer was between 8 and 10 seconds. Because the gas issuing from the separator 16 was free of solids and corrosive materials, the line 29 was of copper tubing having an internal diameter of three-sixteenths inch.

While any form of gas-sampling probe may be employed with the present invention, we prefer to employ with the illustrated embodiment a water-washed probe. A probe of this type prevents the accumulation of solids within the sampling line 14 and within the probe itself. Such accumulation usually occurs at a point in the system where the gas sample temperature drops to its dew point. At this point the solid particles combine with the condensed vapor to form a mud, which accumulates to clog the sampling lines. By providing a flow of washing water along the sampling lines, the mud is washed through the cleaning system and discharged at the waste outlet of the separator 16.

The illustrated water-washed probe 12 comprises a pair of concentric pipes 40 and 41 with space 42 therebetween through which passes the gas sample. A nozzle structure 43 is mounted at one end of the inner pipe 41 and wash water is fed to the nozzle by way of the inner pipe and conduit 44. The conduit is connected to a supply of water which may be the same supply as for the condenser 15.

The nozzle structure 43 is provided with a plurality of orifices 45 and 46. The orifices 45 are directed toward the inlet of pipe 40 to spray water out of the inlet to prevent its closure by accumulation of solid particles. The orifices 46 direct streams of wash water toward the adjacent inner walls of pipe 40 and the water from these orifices is drawn through the probe with the gas sample to maintain clean the internal surfaces of the probe and the sampling line. The rate of wash water flow and its pressure may be controlled by adjustment of valve 47. The pressure is indicated by gage 48.

With the described system of the present invention, the system time lag has been reduced to a significant degree. In addition, corrosion and clogging have been reduced so that the sampling system is continuously operable over long periods of time without necessity of shut-downs for maintenance and/or repair. Accordingly, a clean gas sample is at all times continuously and rapidly fed to the analyzer 17. Therefore, any suitable gas analyzer may be connected for automatic control of furnace or process operation. In addition, the operation of the steam ejector or aspirator 13 at high pressure enables the use of small-diameter, low-cost lines 29 to obtain high-linear velocity sample gas flow without resorting to an excessively large volumetric flow rate of sample gas. Thus, there is lessened the requirements of sample gas to aspirate and clean in order to obtain continuous, accurate analysis.

What is claimed is:

1. A gas sampling apparatus for producing a solid-free stream of gas from a dust and corrosive material ladened atmosphere comprising a gas sampling line having an inlet disposed within the atmosphere, said line including a steam ejector, means for supplying said ejector with steam for developing at the inlet of said sampling line a low pressure for flow into the line of a gaseous stream from the atmosphere, means for thoroughly mixing the gaseous stream with steam from said steam ejector to surround the solid particles within the gaseous stream with the steam, means located downstream of said ejector for directing a stream of condensing water into the mixture of steam and the dust-ladened sample in amount for condensation of the steam, the dust particles in the mixture forming nuclei for condensation of steam to form water droplets to increase the apparent mass of the dust particles, means for controlling the ratio of the rate of gas sample flow to the rate of condensing water flow to minimize release from the water of the same gaseous component as that to be measured, said water providing for condensation of the steam being in amount adequate to dilute corrosive liquids formed by absorption of corrosive materials by the condensed steam, a separator, means for producing rotary flow of the mixture within said separator at a speed developing centrifugal force for movement of the water particles and the dust particles contained therein outwardly with concurrent movement of the gaseous sample inwardly, and outlet means for flow from said separator of a solid-free gas sample for application to an analyzer.

2. A gas sampling apparatus for producing a solid-free stream of gas from a dust-ladened atmosphere comprising a gas sampling line having an inlet disposed within the atmosphere, said line including a steam ejector, means for supplying said ejector with steam for developing at the inlet of said sampling line a low pressure for flow into the line of a gaseous stream from the atmosphere, means for thoroughly mixing the gaseous stream with steam from said steam ejector to surround the solid particles within the gaseous stream with the steam, means located downstream of said ejector and including a flow-controller for directing a stream of water into the mixture of steam and the dust-ladened sample in amount for condensation of the steam, the dust particles in the mixture forming nuclei for condensation of steam to form water droplets to increase the apparent mass of the dust particles and in amount for minimizing the absorption by the water of carbon-dioxide from the gas sample, means for varying the ratio between the rate of gas sample flow and the rate of condenser water flow to minimize the oxygen released from the condensed water to the gas sample, said water providing for condensation of the steam being in amount adequate to dilute corrosive liquids formed by absorption of corrosive materials by the condensed steam, a separator, means for producing rotary flow of said mixture at a speed developing centrifugal force for movement of the water particles and the dust particles contained therein outwardly with concurrent movement of the gaseous sample inwardly, and outlet means for flow from said separator of a solid-free gas sample for application to an analyzer.

3. A gas sampling apparatus for producing a solid-free stream of gas from a dust-ladened atmosphere comprising a gas sampling line having a water-washed probe with an inlet disposed within the dust-ladened atmosphere, means for introducing water into said probe for passage through said probe and along said sampling line for washing internal surfaces thereof to prevent accumulation of dust within said probe and sampling line, said line at a region removed from said atmosphere having a steam ejector therein for developing at the inlet of said probe a low pressure for flow into said line of a gaseous stream from the dust-ladened atmosphere, means for mixing the gaseous stream with the steam from said steam ejector to surround the solid particles within the gaseous stream with the steam, water-introducing means disposed down-stream from said steam ejector for injecting into the mixture of steam and the dust-ladened stream and in thorough mixture therewith water in amount for condensation of the steam, said dust particles within said mixture serving as nuclei wettable by the condensing steam to form water droplets thereby increasing the apparent mass of the dust particles, a separating chamber, an inlet to said separating chamber for directing the mixture of condensed steam and gas tangentially into said chamber for the development of centrifugal force due to the resultant vertical flow therein of the mixture for movement of the dust particles surrounded by droplets of water to the walls of the chamber, said chamber having a space above the point of inlet for a gas separating zone, gas outlet connected to said gas separating zone for outward flow of a solid-free gas sample, and a waste outlet extending from said separating chamber for discharge of the mixture of water, steam condensate and dust particles.

4. In apparatus for obtaining a clean sample of a gas for subsequent analysis, gas cleaning means comprising a gas sampling line including a steam ejector, means for supplying said ejector with steam for effecting aspiration from a dirty atmosphere of a sample of the gas to be cleaned and thorough mixing thereof with the steam to form an intimate mixture of steam and the gas to be cleaned, said ejector producing downstream thereof a pressure above atmospheric pressure to drive the said mixture through said line, means located downstream of said ejector and including a flow-controller for adding water to said mixture at a controlled rate for lowering the temperature of the mixture to a value which produces condensation of said steam about particles of matter contained in said mixture to increase the effective mass of each particle, to effect absorption of any undesired water soluble material contained in said mixture, simultaneously to dilute any corrosive liquids formed thereby, and to minimize the addition to, or removal by the water of, the gas component to be analyzed, and means for separating the gas to be analyzed from the rest of said mixture.

5. A gas sampling appartus for producing a solid-free stream of gas from a dust-ladened atmosphere compring a gas sampling line having an inlet disposed within the atmosphere, said line including a steam ejector ,means for supplying said ejector with steam for developing at the inlet of said sampling line a low pressure for flow into the line of a gaseous stream from the atmosphere, means for thoroughly mixing the gaseous stream with steam from said steam ejector to surround the solid particles within the gaseous stream with the steam, means including a flow-controller for directing a stream of water into the mixture of steam and the dust-ladened sample at a point downstream of said ejector and at a rate which produces condensation of the stream, the dust particles in the mixture forming nuclei for condensation of steam to form water droplets to increase the apparent mass of the dust particles and to minimize the addition to, or the removal by the water of the component of, the gas sample to be analyzed, said water providing for condensation of the steam being in amount adequate to dilute corrosive liquids formed by absorption of corrosive materials by the condensed steam, a separator, means for introducing said mixture into and tangentially of said separator for producing rotation of the mixture within said separator at a speed developing centrifugal force for movement of the water particles and the dust particles contained therein outwardly of the rotating mixture with concurrent movement of the gaseous sample inwardly, and outlet means extending from the upper portion of said separator for flow therethrough of a solid-free gas sample for application to an analyzer.

6. A gas sampling apparatus for producing a solid-free stream of gas from a dust-ladened atmosphere comprising a gas sampling line having a water-washed probe with an inlet disposed within the dust-ladened atmosphere, means for introducing water into said probe for passage through said probe and along said sampling line for washing internal surfaces thereof to prevent accumulation of dust within said probe and sampling line, said line at a region removed from said atmosphere having a steam ejector therein for developing at the inlet of said probe a low pressure for flow into said line of a gaseous stream from the dust-ladened atmosphere, means for mixing the gaseous stream with the steam from said steam ejector to surround the solid particles within the gaseous stream with the steam, water-introducing means disposed downstream from said steam ejector for injecting into the mixture of steam and the dust-ladened stream and in thorough mixture therewith water in amount for condensation of the steam, said dust particles within said mixture serving as nuclei wettable by the condensing steam to form water droplets thereby increasing the apparent mass of the dust partles, a separating chamber, an inlet to the separating chamber for directing into it the mixture of the condensed steam and gas, said chamber having a space for a gas-separating zone, a gas outlet connected to said gas-separating zone for outward flow of a solid-free gas sample, and a waste outlet for discharge of the mixture of the water, steam condensate and dust particles from said separating chamber.

References Cited in the file of this patent

UNITED STATES PATENTS

| | | |
|---|---|---|
| 815,407 | Cooper | Mar. 20, 1906 |
| 2,152,251 | Gay | Mar. 28, 1939 |
| 2,179,919 | Carr | Nov. 14, 1939 |
| 2,356,845 | Hines | Aug. 29, 1944 |
| 2,550,933 | McEvoy | May 1, 1951 |
| 2,579,282 | Vicard | Dec. 18, 1951 |
| 2,604,185 | Johnstone et al. | July 22, 1952 |
| 2,685,205 | Barnard | Aug. 3, 1954 |

UNITED STATES PATENT OFFICE

CERTIFICATE OF CORRECTION

Patent No. 2,895,335                                                   July 21, 1959

Harry A. Kraftson et al.

It is hereby certified that error appears in the printed specification of the above numbered patent requiring correction and that the said Letters Patent should read as corrected below.

Column 2, line 36, for "atmosprere" read -- atmosphere --; column 8, line 11, for "vertical" read -- vortical --; lines 41 and 42, for "compring" read -- comprising --; line 57, for "of the component of," read -- of, the component of --; column 9, line 17, for "partles" read -- particles --.

Signed and sealed this 26th day of July 1960.

(SEAL)
Attest:

KARL H. AXLINE                                            ROBERT C. WATSON
Attesting Officer                                         Commissioner of Patents